Sept. 15, 1936.  J. L. ADAMS, JR  2,054,311
INTERIOR BEAD TRIMMER
Filed Dec. 27, 1932   2 Sheets-Sheet 2
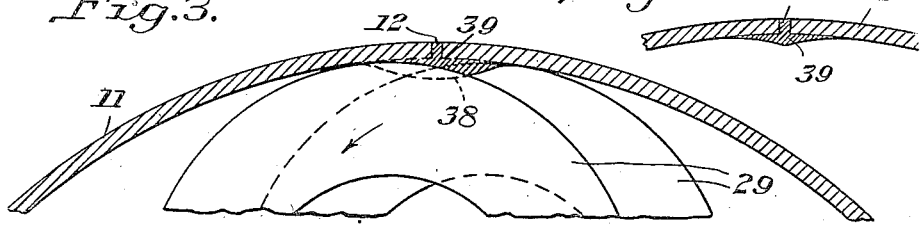
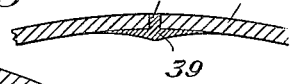
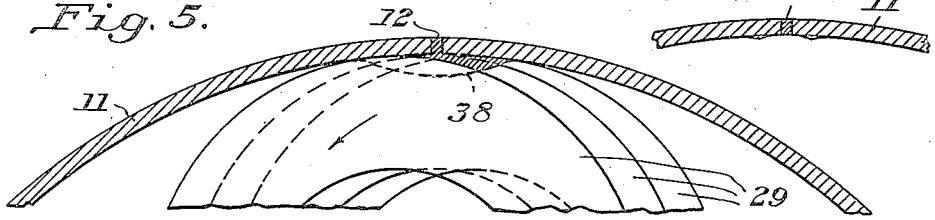
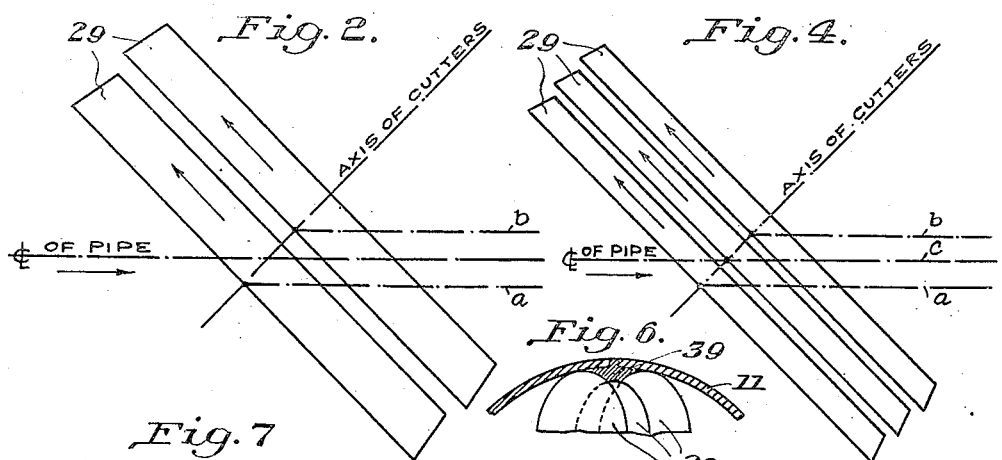
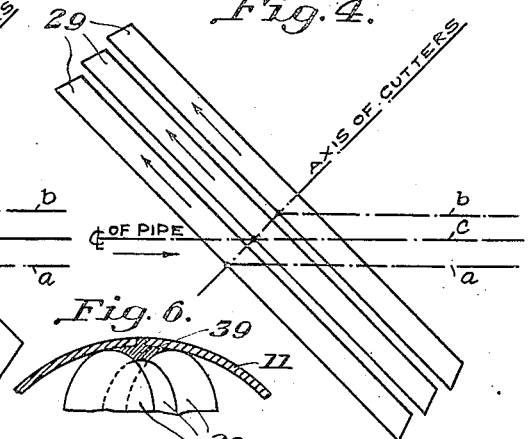
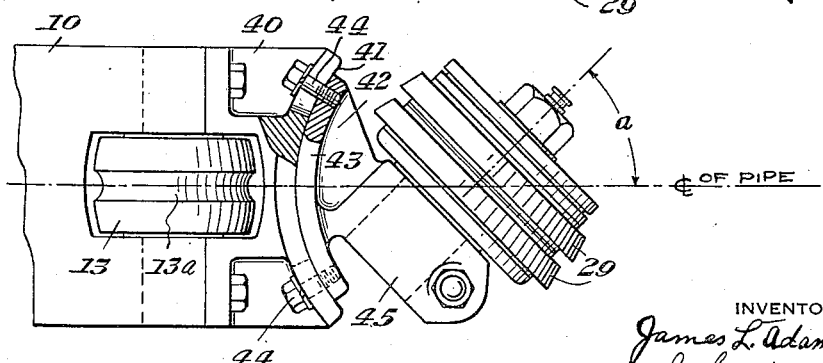

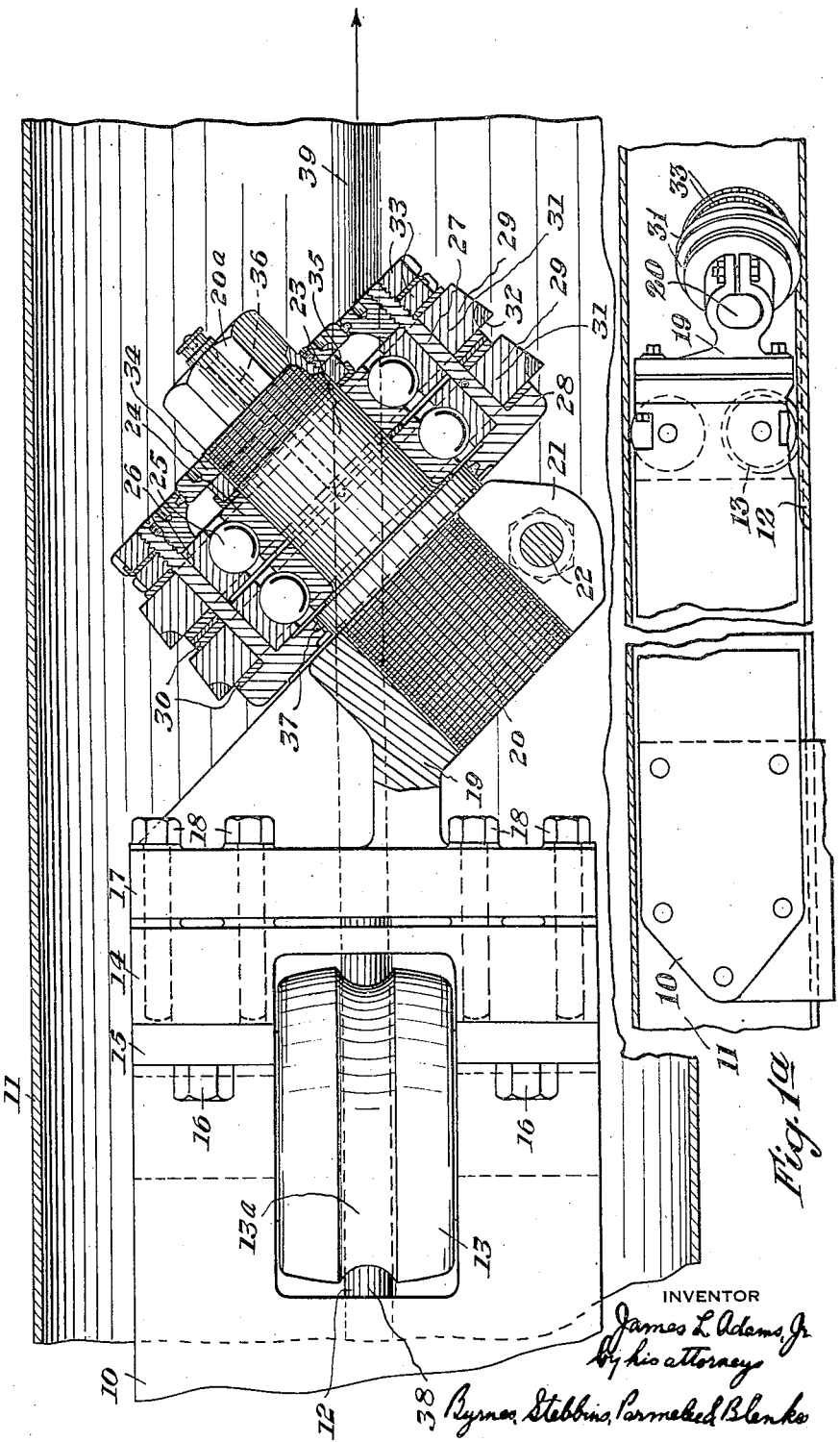

Patented Sept. 15, 1936

2,054,311

UNITED STATES PATENT OFFICE 2,054,311

INTERIOR BEAD TRIMMER

James L. Adams, Jr., Youngstown, Ohio, assignor to The Youngstown Sheet & Tube Company, Youngstown, Ohio, a corporation of Ohio Application December 27, 1932, Serial No. 648,920

10 Claims. (Cl. 90—24)

My invention relates to the art of welding and, in particular, to a device for working on a welded seam to remove excess material therefrom and provide a finished surface thereon. It is known that, in the welding of seams in metallic articles, for example, an axial seam in a formed pipe or tube blank, a certain amount of material is extruded from the hot edges of the seam when they are pushed together to effect the weld. This material includes both the metal of which the blank is formed and the oxide thereof. In the manufacture of pipe by continuous electric welding methods, the excess material along the exterior of the seam has been removed successfully by a number of devices. As far as I am aware, however, no satisfactory device has yet been brought out for removing the excess material extruded upon the interior of the tube.

It is an object of the present invention, therefore, to provide a device of this character which will be effective to remove the excess material from the seam on the inside of the pipe and to leave the seam in a smooth, finished condition. In accordance with my invention, I provide one or more annular cutters adapted to be supported on a mandrel extending within the tube blank past the point of weld. The cutters are disposed in a plane at an angle to the axis of the tube and are offset with respect to the axis so that their edges engage the welded seam on opposite sides of the center line. If only one cutter is used, it is preferably positioned so as to engage the center line of the seam. Movement of the tube past the cutters imparts rotation to the latter and, at the same time, effectively removes the excess material from the seam and provides a good finish therefor on the interior of the tube.

For a more complete understanding of the invention, reference is made to the accompanying drawings illustrating a preferred embodiment of the invention together with certain modifications thereof. It will be apparent to those skilled in the art that numerous modifications of the invention other than those specifically described and illustrated may readily be resorted to within the scope of my broader claims. In the drawings:

Figure 1 is a plan view with parts in section showing the invention in operative position within a welded tube;

Figure 1A is a sectional view taken on a central vertical plane through the structure as shown in Fig. 1;

Figure 2 is a diagrammatic view illustrating the zones of contact of the cutters of the device of Figure 1, the seam being on the far side of the cutters as in Figure 1;

Figure 3 is an inverted, diagrammatic sectional view taken transversely of the pipe just ahead of the cutters showing the effect of the first cutter in removing the excess material from the seam;

Figure 3A is a similar view showing the finished seam after engagement by the second cutter;

Figure 4 is a view similar to Figure 2 showing a modified form of the invention;

Figure 5 is a view similar to Figure 3 illustrating the type of cut made by the first cutter of the device illustrated diagrammatically in Figure 4;

Figure 5A shows the finished shape of the seam after engagement with the second and third cutters of the device shown diagrammatically in Figures 4 and 5;

Figure 6 is a view similar to Figures 3A and 5A illustrating the final effect of still another arrangement of three cutters; and Figure 7 is a view similar to Figure 1 illustrating a modified type of mounting for the cutters.

Referring now in detail to the drawings and, for the present, to Figure 1 in particular, the invention is illustrated as mounted upon the free end 10 of a mandrel lying within a tube 11 in which a seam 12 is being welded by any convenient method, a number of such methods being already well known in the art. The mandrel, of which the free end is shown at 10, is supported from the exterior of the tube 11 by means extending back to and through the open seam in the tube blank, the edges of which are united to form the seam 12. It will be understood that the mandrel extends axially into the pipe to a point well beyond the point of progressive welding of the seam edges, in the direction of pipe travel.

Adjacent the end of the mandrel, a roll 13, grooved at 13a to clear the seam, is journaled in position such as to effect a rolling action on the tube but not on the extruded material. If the welder in which the invention is incorporated includes a final stand of rolls for crushing or thickening the hot seam, the roll 13 will preferably be positioned substantially in the plane thereof. The free end of the mandrel has a terminal casting 14 which is preferably secured to flanges 15 at the rear end of the mandrel by cap-screws 16.

A head 17 is attached to the terminal casting 14 by means of cap-screws 18. A split yoke 19 is cast integral with the head 17 and is threaded to receive a stud 20. Ears 21 adjacent the split in the yoke 19 are bored to receive a clamping bolt 22.

The stud 20, in addition to the threaded end received within the yoke 19, has an eccentric portion 23. Bearing races 24 are mounted thereon and, together with balls 25 and outer races 26 constitute an anti-friction bearing for a bushing 27 mounted for rotation on the eccentric portion 23 of the stud 20.

The bushing 27 has a flange 28 adjacent the yoke 19. The other end of the bushing is threaded externally and internally. Annular cutters 29 are positioned on the bushing 27 being separated from each other and from the bushing by removable liners 30. The cutters 29 comprise soft steel rings 31 and "Stellite" high-speed tool steel inserts 32 welded on the rings and forming the cutting edges thereof. The cutters are secured on the bushing by means of nuts 33.

The end of the eccentric portion 23 is threaded to receive a nut 34 engaging a spacer ring 35 to hold the bearing races 24 in position. The extreme outer end of the stud 20 has the shape of a bolt head as shown at 20a to facilitate adjustment of the stud in the yoke 19. Lubricant passages 36 and sealing rings 37 are provided for the proper lubrication of the bearing surfaces.

The yoke 19, in elevation, is below the center line of the tube 11. The edges of the cutters 29 are thus supported in position for engagement with the bead of extruded material indicated at 38 after the latter has passed the grooved roll 13. Since the cutters are journaled on the eccentric portion of the stud 20, they may be adjusted to and from the inner periphery of the tube by turning the stud. This adjustment also introduces a very slight axial movement of the stud itself in the threaded end 20, and by a combination of the two adjustments as required, together with a plurality of liners 30 of differing thicknesses, the desired relation of the cutters to the work can be obtained. The clamping bolt 22, of course, is loosened while adjustments of the stud are being made. As before stated, the hexagonal head 20a on the stud makes the adjustment of this member a very simple matter.

Figure 2 shows diagrammatically the preferred adjustment of the device when two cutters are employed, with respect to the central line thereof. It will be apparent from inspection of Figure 2 that, with the cutters in the illustrated position relative to the center line of the tube, the point of tangency of the forward cutter (that first engaged by the extruded material) is disposed below the center line as shown in Figure 2. The point of tangency of the rear cutter is spaced above the center line and back of the tangent point of the forward cutter.

Figure 3 shows how the forward cutter removes the excess material and also illustrates the amount of material to be removed from the other side of the seam by the rear cutter. The result of the engagement of both cutters with the seam, as shown in Figure 3A, will be the formation of a slightly thickened portion 39, the contour of which corresponds to that of the axial projection of the two cutting edges between their points of tangency with the inner periphery of the tube and their point of apparent intersection.

Figure 4 illustrates diagrammatically a modified form of the invention which is similar in all respects to that shown in Figure 2, except that three cutters are employed instead of two. The device is adjusted so that the middle cutter is tangent to the inner periphery of the pipe wall on the center line of the seam. The forward and rear cutters engage the excess material extruded from the seam on both sides of the vertical plane passing through the center line of the pipe, as in the modification already described. The forward and rear cutters operate in the manner above set forth but the center cutter has the effect of removing the thickened portion 39 since it is tangent to the inner periphery of the tube along the center line of the seam. The cutters are effective sequentially in the direction of movement of the pipe indicated by the arrow in Figures 2 and 4. This type of cutter is to be used only when the inside of pipe must be made substantially circular, for some special reason.

Figure 5 shows the condition of the interior of the seam after it has been engaged by the first cutter. The axial projections of the peripheries of the second and third cutters, shown in dotted lines, determine the amount of material removed thereby and, therefore, the contour of the finished seam interior, shown in Figure 5A.

It is hardly necessary to state that, because of the angular relation between the plane of the cutters and the path of movement of the tube, a circumferential component of force is effective on the cutters to turn them and the bushing on which they are mounted, on the anti-friction bearings which support them on the eccentric portion 23 of the stud 20. The rotation of the cutters thus causes a fresh cutting portion of the angular cutters to be presented to the work continuously. This is the only way any cutter edge can be made to stand up under the terrific heat along the welded seam. The excess material removed by the cutters is shunted to one side of the seam by the angular position of the cutters and the rotary movement, and can easily be removed from the tube at a subsequent stage of the maufacturing process. The rotary cutters actually have about the same effect on the bead as would a stationary cutting tool. The action, in other words, is purely a simple shearing or machining. The rotary cutters, however, remove the sheared burr and constantly present a fresh shearing edge, so that the excessive heating as well as the usual clogging and dulling of the edge, which have been experienced with stationary tools, are avoided. The cutting action results from the movement of the advancing burr past the plane of the cutting edge, and the rubbing friction of the diverted material.

Instead of employing three cutters as shown in Figure 4, a single cutter may, in some few cases, be employed with fairly satisfactory results. In the case of a single cutter, it is usually located substantially in the position of the central cutter of Figure 4.

Figure 6 illustrates another possible modification of the invention according to which three cutters are employed, as in Figure 4, but the central cutter being smaller in diameter than the forward and rear cutters, which latter are also spaced further apart than in the figure just referred to. This arrangement produces a much thickened seam of the section clearly shown, somewhat exaggerated in Figure 6.

Figure 7 illustrates a further modification of the structure of Figure 1. According to this modification, the terminal casting 40 of the mandrel, part of which is shown at 10, is provided with an arcuate seat 41. A head 42 is provided with a shoe 43 adapted to adjustably slide on the arcuate seat 41, these contacting faces being corrugated if preferred, to prevent slippage. Clamping cap-screws 44 extend through slots in the seat 41 for securing the head thereto in adjusted position. The head 42 carries a yoke 45 similar to that shown in Figure 1 at 19, and the remainder of the structure is identical to that of Figure 1. The construction of Figure 7, obviously, provides for a ready adjustment of the angle made by the plane of the cutters with the center line of the pipe. The same result might be secured with the structure of Figure 1 by providing a plurality of heads having their yokes disposed at different angles to a plane perpendicular to the axis of the tube.

It will be apparent from the foregoing description that the invention provides a device for removing excess material from the interior of an axial welded seam in a pipe or tube, which device is capable of easy adjustment, is effective in operation and simple and comparatively inexpensive in construction. It will also be apparent that the contour of the finished seam on the interior of the pipe may take a number of different forms depending upon the number and disposition of the cutters employed. Any desired thickening of the seam may be attained or the seam may be machined off to substantially the same thickness as the remainer of the tube wall.

Although I have illustrated and described herein but one preferred form of the invention and certain modifications thereof, it will be obvious that numerous changes in the present disclosure may be made without departing from the spirit of the invention or the scope of the appended claims. Thus a similar angularly mounted circular cutter might be used to trim the welded seam between two flat plates.

I claim:

1. In a tube finishing apparatus, a non-rotatable mandrel, a yoke extending at an oblique angle to said mandrel, a stud rotatable and axially adjustable in said yoke, said stud having an eccentric end portion, and an annular cutter on said portion, means supporting said cutter thereon for free rotation in its own plane on said eccentric portion and tangentially engaging the tube only in portions adjacent a longitudinal welded seam therein.

2. In a tube finishing apparatus, the combination with a non-rotatable mandrel, of a yoke exending at an oblique angle from the mandrel, the yoke being rotatable relative to the mandrel in a plane containing the mandrel axis, a shaft secured in said yoke, and an annular cutter thereon, means supporting the cutter on the shaft for rotation in a plane oblique to the longitudinal axis of the mandrel, said cutter being adapted to engage tangentially the interior of the tube.

3. A burr trimmer for the interiors of welded tubes, comprising a support non-rotatable relatively to the seam of a welded tube as the tube is advanced generally axially thereof over said support, and a plurality of cutters rotatably carried by said support and mounted in fixed relation to said seam, said cutters being disposed substantially tangent to the interior of the tube at opposite sides of the center line of the seam.

4. Apparatus for trimming the interior of a seam in a moving tube blank during progressive welding of the seam, comprising a support extending between the edges of the open seam cleft in the blank and within the blank to a point beyond the junction of the blank edges, said support being non-rotatable relatively to said seam as the tube is advanced generally axially thereof over said support, a shaft carried by said support in fixed relation to said seam and with the axis thereof extending transversely of the blank at an acute angle to the blank axis, and a rotatable cutter on said shaft engaging the interior of the seam.

5. The apparatus defined by claim 3 characterized by said cutters being mounted parallel to each other on a common shaft for rotation in planes perpendicular to said shaft.

6. The apparatus defined by claim 3 characterized by said cutters including one which is disposed to contact the seam substantially along its center line, all said cutters being mounted to engage the interior of the tube only at or near the seam.

7. The apparatus defined by claim 3 characterized by said plurality of cutters including one having a diameter slightly different from that of the other and being disposed adjacent the latter for rotation on the same axis.

8. Apparatus for removing extrusion material from the interior of a longitudinal seam in a length of welded pipe, comprising a mandrel, means extending through the unwelded seam for supporting the mandrel non-rotatably relatively to the seam as relative movement occurs between the mandrel and the pipe generally axially thereof, a shaft carried by said mandrel, the axis of said shaft being disposed at an oblique angle to the axis of said mandrel, and a rotatable cutter carried by said shaft, the angle between the axes of the shaft and mandrel being such that said cutter tends to rotate by frictional engagement with the seam on relative movement therebetween, said shaft having an eccentric portion on which said cutter is rotatable, whereby the cutter may be adjusted to and from the work.

9. Apparatus for removing extrusion material from the interior of a longitudinal seam in a length of welded pipe, comprising a mandrel, means extending through the unwelded seam for supporting the mandrel non-rotatably relatively to the seam as relative movement occurs between the mandrel and the pipe generally axially thereof, a shaft carried by said mandrel, the axis of said shaft being disposed at an oblique angle to the axis of said mandrel, and a rotatable cutter carried by said shaft, the angle between the axes of the shaft and mandrel being such that said cutter tends to rotate by frictional engagement with the seam on relative movement therebetween, and a plurality of cutters mounted on said shaft, one cutter engaging the central portion of the seam and another cutter engaging the edge portion thereof, the first-mentioned cutter being of smaller diameter than the second-mentioned cutter.

10. Apparatus for removing extrusion material from the interior of a longitudinal seam in a length of welded pipe, comprising a mandrel non-rotatable relatively to the seam of a welded pipe as relative movement occurs between the mandrel and the pipe generally axially thereof, a shaft carried by said mandrel, the axis of said shaft being disposed at an oblique angle to the axis of said mandrel, and a plurality of rotatable cutters carried by said shaft for progressive engagement with said seam along spaced, substantially parallel lines, the angle between the axes of the shaft and mandrel being such that said cutter tends to rotate by frictional engagement with the seam on relative movement therebetween.

JAMES L. ADAMS, JR.